United States Patent [19]

Giebeler et al.

[11] Patent Number: 4,678,715
[45] Date of Patent: Jul. 7, 1987

[54] PROCESS FOR IMPROVING WOOD AND USE OF THE IMPROVED WOOD

[75] Inventors: Eberhard Giebeler, Mülheim; Gerhard Wilhelm, Ladenburg, both of Fed. Rep. of Germany

[73] Assignee: Ruetgerswerke Aktiengesellschaft, Frankfurt, Fed. Rep. of Germany

[21] Appl. No.: 817,932

[22] Filed: Jan. 10, 1986

[30] Foreign Application Priority Data

Feb. 13, 1985 [DE] Fed. Rep. of Germany ....... 3504898

[51] Int. Cl.$^4$ ...................... B32B 21/04; B32B 21/06; B05D 1/18; B05D 3/02
[52] U.S. Cl. .................................. 428/537.1; 427/297; 427/317; 427/325; 427/393; 427/440; 428/541
[58] Field of Search ............... 427/297, 440, 317, 325, 427/393; 428/541, 537.1

[56] References Cited

U.S. PATENT DOCUMENTS

| 3,765,934 | 10/1973 | Gaylord | 427/297 |
| 3,968,276 | 7/1976 | Allen | 427/297 |
| 4,399,195 | 8/1983 | Allen | 427/297 X |
| 4,500,568 | 2/1985 | Pearson et al. | 427/297 X |

Primary Examiner—Michael R. Lusignan
Attorney, Agent, or Firm—Beveridge, DeGrandi & Weilacher

[57] ABSTRACT

Wood that is especially suited for the manufacture of resonating bodies, is improved according to a process in which small amounts of reactive components of thermosetting polymers are introduced into the wood shortly before or during a heat treatment under pressure.

17 Claims, No Drawings

PROCESS FOR IMPROVING WOOD AND USE OF THE IMPROVED WOOD

The invention relates to a process for improving wood in order to preserve its dimensional stability and its resonant properties.

Dimensional stability and resonant properties are of particular importance if wood is used for the manufacture of resonating bodies, such as musical instruments, cabinets for high-quality electroacoustic equipment or for the panelling of concert halls. On the one hand, only highly seasoned, specially selected, so-called resonant wood with the most uniform structure of annular rings is used for these applications. Such wood is very rare and expensive. On the other hand, efforts have been made to improve the quality of ordinary wood by varnishing, impregnation or processing. Varnishing or impregnating wood has only a moderate effect on the dimensional stability and, in addition, impairs the resonant properties, since it clogs the pores and capillaries of the wood and thereby adversely effects the sound properties. In treating wood, for example in the manner taught by German patent No. 878,553 or in particular by U.S. Pat. No. 4,377,040, the necessary dimensional stability is preserved even if not specially selected wood is treated without prior seasoning; the sound properties, however, are essentially improved only to the extent that, due to minor shrinking and swelling effects as a result of exposure to varying moisture levels, the resonant properties remain more constant.

Therefore, the present invention has as its object the provision of a process for improving wood in which with ordinary, not preseasoned, wood better resonant and acoustic properties are achieved and which properties are not affected by varying weather conditions, and further, which properties correspond to those of seasoned and selected resonant woods.

In attaining the above object of the invention, one feature resides in a process for improving the dimensional stability and resonant properties of wood which, in the absence of the treatment of the invention, would not possess the described dimensional stability and resonant properties. The process comprises treating wood under conditions whereby there is a concurrent controlled breakdown of the constituents and components of the wood and a formation of polymer within the capillaries of the wood. The polymer is deposited in mono- or oligomolecular layers on the capillary walls without clogging the capillaries. The process accomplishes a strengthening of the capillary walls whereby sound vibrations can be transmitted without undesirable dampening of the sound.

Typically, the wood is subjected to a temperature in the range of about 140° to about 200° C. and pressures of about 3 to about 15 bar during, or shortly after, the introduction of small amounts of reactive components of thermosetting polymers into the capillaries of the wood.

Although the moisture content of the wood used can vary, typically it is not more than 10 weight percent. In carrying out the process, it has been found particularly useful to employ 0.1 to 2.5 weight percent, relative to the dry weight of the wood, of reactive components of thermosetting polymers for introduction into the wood. The reactive components are introduced into a closed reactor with the wood, volatilized during the reactor's heating phase, and, aided by the applied pressure, penetrate into the capillaries of the wood.

In a more detailed aspect of the invention, the process is carried out by introducing the wood into a vacuum chamber in vacuo, and gaseous furfuryl alcohol, phenol, or a phenol derivative or phenol or a phenol-charged carrier gas is used to provide the pressure. After this first stage of the reaction has been carried out, the wood is then again treated in vacuo, using gaseous aldehyde or an aldehyde-charged carrier gas to create the pressure conditions. During the second stage of the process, the wood is treated for 0.5 to 8 hours at temperatures of 140 to 200° C. and pressures of 3 to 15 bar. It has been found to be advantageous to expose the wood to vibrations in the range of 16 to 4,000 Hz during the pressure and temperature treatment of the wood.

Two processes are known to occur during the seasoning of wood:

Certain wood constituents, mostly hemicelluloses, are broken down. Since these substances are essentially responsible for the swelling of the wood, the weather-dependent variations are improved as a result.

Furthermore, some hardening of the wood occurs. In the case of wood with good resonant properties, these processes take place with the formation of uniform capillaries with reinforced walls which, in the final analysis, are decisive for obtaining the uniform, substantially undamped vibrations and thus for the good sound qualities.

It has been found that this natural process of long duration can be artificially accelerated and suitably controlled if a breakdown of wood constituents and a formation of polymers within the wood capillaries can be caused to proceed concurrently in the reactor, during which the polymer being produced deposits in such small amounts that it only strengthens the walls of the capillaries without clogging them at all; i.e., only mono- or oligomolecular layers of polymer may form on the capillary walls, layers so thin that they aid in transmitting vibrations without causing additional, undesirable damping of sound. The capillary passages of the wood are not clogged or blocked.

This is achieved according to the invention by introducing small amounts of reactive components into the capillary spaces of the wood, components that can react with each other and with constituents of the wood to form thermosetting polymers, and by reacting these components to form the corresponding polymers under pressure during a concurrent or rapidly ensuing heat treatment, while other unstable wood constituents are broken down during the same treatment.

The starting material for the process embodying the invention is ordinary crack-free heart wood with a moisture content of less than 10 weight percent. The preferred moisture content is 2 to 5 weight percent. The type of wood is not significant, so that high-quality improved wood can be produced from inexpensive poplar, spruce or pine wood. Likewise, there are no specific requirements for the quality of the original wood, other than that it should have no obvious blemishes such as knotholes. The wood pieces may be of any convenient size, shape and thickness. For example, panels of the size 600×300 mm and 3 mm thick are illustrative.

Reactive components of thermosetting polymers are monomeric chemical substances that can react with application of heat with other reactive components or with wood constituents to form thermosetting polymers. These polymerizable monomers are well known in the art.

Examples of such polymerizable monomeric substances capable of reacting with wood constituents are aldehydes such as formaldehyde or acetaldehyde, ketones, epichlorohydrin, acrylic acid, and maleic acid or anhydride.

Other reactive components such as urea, furfuryl alcohol, melamine or phenol and/or phenol derivatives such as cresols or xylenols require an aldehyde or ketone as a coreactant. In this case, both mutually reacting components must be introduced into the wood capillaries. Preferably, phenol and formaldehyde are used as the reactive components and polymerize under the conditions of the process to deposit a thermoset polymer on the walls of the capillaries in the wood.

There are various ways of introducing the reactants into the wood: the wood can be saturated with a solution of one reactive component in water or in an organic solvent and then dried, or the wood can be stored together with one or more gaseous and/or volatilizing reactants in a narrow, sealed space, for example, wrapped in sheeting, so that the reactants can enter the capillaries in the wood by diffusion. Both methods are very time consuming. It is therefore preferable to introduce the reactive component(s) into the wood in a closed reaction zone; i.e. a reactor via the vapor phase. This can be done by applying a vacuum to the reactor stacked with wood, then saturating it, the gas introduced into the reactor for this purpose being either a gaseous reactive component or an inert carrier gas containing the reactive component. In the simplest embodiment, the reactive components are introduced into the reactor together with the wood, volatilized during the reactor's heating phase, and aided by the applied pressure, the reactants penetrate into the capillaries of the wood.

If two mutually reacting components of thermosetting polymers are introduced into the wood, they can be introduced together, or separately, at temperatures below their reaction thresholds. In the case of the preferred reactive components, phenol and formaldehyde, an especially intensive improvement is achieved by heating the wood with about 2 weight percent phenol in the reactor to about 80° C. in the first processing step, then evacuating to a pressure of about 25 to about 100 mbar. After about 15 minutes, the vacuum is saturated with nitrogen; the reactor is evacuated anew and, after another 10 to 15 minutes, saturated with nitrogen containing up to 10 volume percent formaldehyde gas. The reactor is then heated to a temperature ranging from about 140° to about 200° C., and a final pressure of about 3 to about 15 bar is applied by injecting preheated nitrogen. After the desired pressure and temperature are reached, these reaction conditions are maintained for another 0.5 to 8 hours. The vacuum is then saturated and the improved wood can be used immediately after cooling for further processing for the fabrication of resonating bodies.

During the thermal pressure treatment, the hydrolyzing components of the wood, chiefly hemicelluloses, are degraded. Acids such as formic or acetic acids which, in turn, catalyze the condensation reaction of phenol with formaldehyde, are produced, among others, as reaction products. As a result, this condensation reaction occurs preferably on the capillary walls. Other reaction products such as furfuryl alcohol or phenolic components, in turn, can again react with the formaldehyde introduced into the capillaries and cross-link. Because these substances cross-link readily under the conditions according to the invention, as long as they are still in the walls of the wood fibers and capillaries, they also contribute to strengthening and hardening these capillary walls and thereby to improving the vibration properties. Thus, an improved, strengthened wood is formed with sound properties similar to those of old, highly valuable musical instruments, independent of weather variations. These acoustic properties can be further improved if the wood is exposed to vibrations in the range of 16 to 4000 Hz during the pressure and heat treatment. Any suitable equipment can be used to create the vibrations as will be apparent to those skilled in the art.

The following examples show the improvements in sound properties of wood that has been treated according to the invention, and illustrate the exceptional suitability of the resulting improved wood for the manufacture of resonating bodies.

EXAMPLE 1

3-mm thick spruce sawed veneer, 600×300 mm in size, with the grain running parallel lengthwise and perpendicular to the cross section (radial section) and with about 2 mm between annular rings, is predried to a 5% moisture content and heated in an autoclave to 170° C. over 15 minutes. The heat carrier is heated nitrogen, compressed to 9 bar. A 37% formaldehyde solution and phenol are introduced, at the same time as the wood, in two separate trays in amounts sufficient to achieve gas space saturation. After an additional 45 minutes, the pressure is reduced to atmospheric pressure over 15 minutes, the circulation of the inert gas is stopped, and the samples are removed from the autoclave (the sample obtained is identified as Sample 1.1).

After storage (14 days at 20° C. and 60% humidity), the samples are compared with untreated reference samples. The reference samples in each case come from the adjacent radial section and thus correspond in texture and in all other critical properties to the starting material used for the refinement (Sample 1.2).

Moreover, the samples are compared with other samples that had been subjected to the same temperature and pressure treatment but had not been charged with phenol and formaldehyde (Sample 1.3).

The acoustic analysis of samples is performed in a flexural loading fatigue testing machine in accordance with DIN 53440. Samples are mounted on one side and caused to vibrate electromagnetically by means of an attached small metal plate. The free-oscillating length is 180 mm.

| Sample | Density $\rho$ [kg/m$^3$] | Resonant Frequency [Hz] | E-Modulus $10^{10}$[N/m$^2$] | $E/\rho$ $10^6$[m$^2$/s$^2$] | Loss Factor |
|---|---|---|---|---|---|
| 1.1 | 480 | 112 | 1.36 | 28.3 | 0.0082 |
| | | 697 | 1.38 | 28.7 | 0.0089 |
| | | 1955 | 1.37 | 28.5 | 0.012 |
| 1.2 | 465 | 109 | 1.26 | 27.1 | 0.0085 |
| | | 687 | 1.28 | 27.4 | 0.0086 |
| | | 1920 | 1.26 | 27.1 | 0.01 |
| 1.3 | 450 | 106 | 1.18 | 26.2 | 0.0092 |
| | | 657 | 1.15 | 25.5 | 0.011 |
| | | 1835 | 1.14 | 25.3 | 0.013 |

The heat-treated sample charged with reactive components of thermosetting polymers (Sample 1.1) experiences an increase in density of about 2%. The modulus of elasticity in bending is about 10-20% higher. The loss factor is slightly higher than for the untreated Sample 1.2. The primary ratio of the modulus of elasticity/density for undulation propagation rate is the highest for Sample 1.1. The resonant frequencies likewise shift toward higher values. Therefore, the Sample 1.1 treated according to the invention is superior.

When the samples are tapped (sound test), Sample 1.1 sounds clearer and less damped than Samples 1.2 and 1.3. This psychoacoustic effect is also perceptible when similarly treated wood is fabricated into resonant surfaces on the backs of stringed and plucked instruments. Instruments fabricated according to the invention correspond in their sound quality to highly valuable, old instruments. Moreover, the sound properties are not affected by changes in humidity and weather.

EXAMPLE 2

As in Example 1, Sample 1.1, wood samples are thermally treated in the presence of phenol and formaldehyde, but with the following variations in treatment conditions:
Processing time: 75 min
Processing temperature: 190° C.
Pressure: 11 bar Samples (2.1) obtained by this process are compared with untreated reference samples (2.2).

| Sample | Density $\rho$ [kg/m$^3$] | Resonant Frequency [Hz] | E-Modulus $10^{10}$[N/m$^2$] | E/$\rho$ $10^6$[m$^2$/s$^2$] | Loss Factor |
|---|---|---|---|---|---|
| 2.1 | 435 | 114 | 1.23 | 28.3 | 0.0076 |
|  |  | 715 | 1.21 | 27.8 | 0.0098 |
|  |  | 1990 | 1.19 | 27.3 | 0.009 |
| 2.2 | 400 | 111 | 1.06 | 26.5 | 0.0089 |
|  |  | 696 | 1.05 | 26.2 | 0.009 |
|  |  | 1940 | 1.04 | 26 | 0.01 |

Similarly, the same positive improving effect on the E/ratio is also achieved at 190° C. as in Example 1. Psychoacoustically, Sample 2.1 sounds clearer than Sample 2.2 in the sound test, and also clearer than Sample 1.1.

EXAMPLE 3

A sample of redwood is treated as in Example 1.1 (Sample 3.1). Comparative acoustic analysis with untreated wood (Sample 3.2) produces the following values:

| Sample | Density $\rho$ [kg/m$^3$] | Resonant Frequency [Hz] | E-Modulus $10^{10}$[N/m$^2$] | E/$\rho$ $10^6$[m$^2$/s$^2$] | Loss Factor |
|---|---|---|---|---|---|
| 3.1 | 435 | 86 | 0.84 | 19.3 | 0.0064 |
|  |  | 544 | 0.85 | 19.5 | 0.013 |
|  |  | 1509 | 0.83 | 19.1 | 0.0086 |
|  |  | 2900 | 0.8 | 18.4 | 0.0096 |
| 3.2 | 400 | 74 | 0.56 | 14 | 0.0096 |
|  |  | 478 | 0.6 | 15 | 0.0079 |
|  |  | 1360 | 0.62 | 15.5 | 0.0076 |
|  |  | 2620 | 0.58 | 14.5 | 0.0088 |

EXAMPLE 4

A sample of cedar wood is treated as in Example 1.1 (Sample 4.1). A reference sample is subjected to the same pressure and temperature treatment, but not in the presence of phenol and formaldehyde. After this purely thermal refinement, the reference sample is kept for 7 days at 80° C. in a phenol- and formaldehyde-saturated atmosphere to enable the molecular adsorption of these components. This sample is then heated for 8 hours in a phenol-, formaldehyde-, and acetic acid-saturated atmosphere for 8 hours at 120° C. (Sample 4.2). Samples 4.1 and 4.2 are compared acoustically with untreated control samples (4.3). The flexural loading fatigue tests are conducted with strips 3 mm × 10 mm × 200 mm in size.

| Sample | Density $\rho$ [kg/m$^3$] | Resonant Frequency [Hz] | E-Modulus $10^{10}$[N/m$^2$] | E/$\rho$ $10^6$[m$^2$/s$^2$] | Loss Factor |
|---|---|---|---|---|---|
| 4.1 | 375 | 319 | 0.670 | 17.8 | 0.0056 |
|  |  | 875 | 0.630 | 16.8 | 0.0089 |
|  |  | 1745 | 0.665 | 17.7 | 0.0086 |
|  |  | 2970 | 0.72 | 19.2 | 0.0090 |
| 4.2 | 375 | 295 | 0.525 | 14.0 | 0.005 |
|  |  | 800 | 0.482 | 12.8 | 0.0065 |
|  |  | 1600 | 0.507 | 1.35 | 0.0080 |
|  |  | 2725 | 0.537 | 14.3 | 0.0080 |
|  |  | 4140 | 0.550 | 14.6 | 0.0370 |
| 4.3 | 380 | 315 | 0.626 | 16.47 | 0.0041 |
|  |  | 855 | 0.590 | 15.5 | 0.0067 |
|  |  | 1710 | 0.610 | 16.0 | 0.0078 |
|  |  | 2850 | 0.630 | 16.5 | 0.0080 |

EXAMPLE 5

Resonant spruce wood is treated for 75 minutes at 11 bar and 190° C. for 75 minutes like the reference sample in Example 2:
(a) in a pure inert gas atmosphere (Sample 5.1) or
(b) in an inert gas atmosphere enriched with 2 volume percent formaldehyde (Sample 5.2)

The acoustic evaluation in comparison with an untreated samples (5.3) produces the following flexural loading fatigue test values for samples 4 mm × 10mm × 200 mm in size.

| Sample | Density $\rho$ [kg/m$^3$] | Resonant Frequency [Hz] | E-Modulus $10^{10}$[N/m$^2$] | E/$\rho$ $10^6$[m$^2$/s$^2$] | Loss Factor |
|---|---|---|---|---|---|
| 5.1 | 455 | 543 | 1.09 | 24.0 | 0.011 |
|  |  | 1480 | 1.02 | 22.4 | 0.010 |
|  |  | 2870 | 1.01 | 22.2 | 0.011 |
|  |  | 4780 | 1.01 | 22.2 | 0.041 |
| 5.2 | 450 | 547 | 1.11 | 24.6 | 0.007 |
|  |  | 1490 | 1.05 | 23.3 | 0.010 |
|  |  | 2900 | 1.02 | 22.6 | 0.010 |
|  |  | 4820 | 1.03 | 23.0 | 0.04 |
| 5.3 | 510 | 542 | 1.22 | 23.9 | 0.009 |
|  |  | 1470 | 1.14 | 22.3 | 0.010 |
|  |  | 2830 | 1.1 | 21.5 | 0.013 |
|  |  | 4715 | 1.11 | 21.7 | 0.050 |

Further variations and modifications of the foregoing will be apparent to those skilled in the art from a consideration of the above and such variations and modifications are intended to be encompassed by the claims appended hereto.

The German application No. P35 04 898.0 is relied on and incorporated herein by reference.

We claim:
1. A process for improving wood to impart dimensional stability and resonant properties thereto comprising subjecting wood babies to controlled conditions of elevated temperature and pressure in a closed reaction zone, introducing controlled amounts of at least one polymerizable monomer into said reaction zone under conditions whereby said monomer will polymerize and thereby to deposit a thermoset polymer into the capillary walls of the wood without clogging the capillary passages of the wood, said controlled amount being 0.1 to 2.5 weight percent relative to the dry weight of the wood.

2. The process as set forth in claim 1, wherein the moisture content of the wood used is not more than 10 weight percent.

3. The process as set forth in claim 1, wherein the amount of monomer is controlled to deposit the resin in a mono- or oligomeric layer on the capillary walls and the resulting layer is so thin that it aids in transmitting vibration without causing undesirable damping of sound.

4. The process as set forth in claim 1, wherein the said at least one reactive component is introduced into the reaction zone with the wood, and is volatilized therein by heating to said elevated temperature and penetrates into the capillaries of the wood aided by the elevated pressure.

5. The process as set forth in claim 1, wherein the wood is subjected to a temperature of about 140° to about 200° C.

6. The process as set forth in claim 1, wherein the elevated pressure ranges from about 3 to about 15 bar.

7. The process as set forth in claim 1, wherein the wood is introduced into the reaction zone prior to elevating the temperature and pressure thereof.

8. The process as set forth in claim 1, wherein the wood is introduced into the reaction zone essentially simultaneously with elevating the temperature and pressure thereof.

9. The process as set forth in claim 1, wherein said at least one polymerizable monomer is a substance capable of reacting with wood constituents under the prevailing conditions in the reaction zone.

10. The process as set forth in claim 9, wherein said substance is selected from the group consisting of aldehydes, ketones, epichlorohydrin, acrylic acid, maleic acid and maleic anhydride.

11. The process as set forth in claim 1, wherein said substance is selected from the group consisting of aldehydes, ketones, epichlorohydrin, acrylic acid, maleic acid and maleic anhydride.

12. The process as set forth in claim 11, wherein at least one of the following reactive components is additionally present: urea, furfuryl alcohol, melamine, phenol, cresol and xylenol.

13. The process as set forth in claim 1, wherein the reaction zone is a vacuum chamber, and in a first step introducing at least one monomer into said chamber at a temperature below its reaction threshold temperature, heating to an elevated temperature, evacuating to a determined pressure, thereafter introducing a second polymerizable monomer for reaction with said monomer introduced in said first step, heating to the reaction temperature of the polymerizable monomers, raising the pressure in said zone and maintaining the reaction zone under desired condition until the monomers polymerize and deposit a thermoset polymer on the capillary walls of the wood.

14. The process as set forth in claim 1, wherein the reaction zone is a vacuum chamber in vacuo, and in a first step gaseous furfuryl alcohol, phenol, or a phenol derivative or phenol or a phenol-charged carrier gas is used for the pressure compensation, the wood is then again treated in vacuo, and gaseous aldehyde or an aldehyde-charged carrier gas is used for the second step pressure compensation, after which the wood is treated for 0.5 to 8 hours at temperatures of about 140 to about 200° C. and pressures of about 3 to about 15 bar.

15. The process as set forth in claim 1, wherein the wood is exposed to vibrations in the range of 16 to 4,000 Hz during the pressure and temperature treatment of the wood.

16. Wood improved according to the method of claim 1.

17. A wood panel treated according to the method of claim 1.

* * * * *